United States Patent
Liu et al.

(10) Patent No.: US 10,887,401 B2
(45) Date of Patent: Jan. 5, 2021

(54) DEVICE CONNECTION METHOD AND TERMINAL

(71) Applicant: Huawei Technologies Co., Ltd., Shenzhen (CN)

(72) Inventors: Chun Liu, Shenzhen (CN); Kuang Ting Chuang, Shenzhen (CN); Zhonglin Xia, Shanghai (CN); Xi Li, Shanghai (CN); Jiajia Hu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/472,513

(22) PCT Filed: May 31, 2017

(86) PCT No.: PCT/CN2017/086579
§ 371 (c)(1),
(2) Date: Jun. 21, 2019

(87) PCT Pub. No.: WO2018/120645
PCT Pub. Date: Jul. 5, 2018

(65) Prior Publication Data
US 2020/0177679 A1 Jun. 4, 2020

(30) Foreign Application Priority Data
Dec. 27, 2016 (CN) .......................... 2016 1 1225485

(51) Int. Cl.
*H04L 29/08* (2006.01)
*H04L 29/06* (2006.01)
*H04W 4/48* (2018.01)

(52) U.S. Cl.
CPC ........ *H04L 67/141* (2013.01); *H04L 65/1059* (2013.01); *H04W 4/48* (2018.02)

(58) Field of Classification Search
CPC ..... H04L 67/141; H04L 65/1059; H04W 4/48
See application file for complete search history.

(56) References Cited

U.S. PATENT DOCUMENTS

| 8,713,212 B1 | 4/2014 | Yoshinaga |
| 2009/0112394 A1 | 4/2009 | Lepejian et al. |

(Continued)

FOREIGN PATENT DOCUMENTS

| CN | 202043133 U | 11/2011 |
| CN | 103200460 A | 7/2013 |
| CN | 103401997 A | 11/2013 |

OTHER PUBLICATIONS

Sojitra, "Android Application Framework", LinkedIn, 5 pages. (Year: 2016).*

(Continued)

*Primary Examiner* — Arvin Eskandarnia
*Assistant Examiner* — Chhian (Amy) Ling
(74) *Attorney, Agent, or Firm* — Conley Rose, P.C.

(57) ABSTRACT

A device connection method includes a terminal receiving a communications connection request of a vehicular device, enabling a communications mode corresponding to the communication connection request in a process of connecting to a service of an interconnect protocol, and when determining that the service is successfully connected and that the communications mode is successfully enabled, determining that the terminal is successfully connected to the vehicular device using the interconnect protocol.

20 Claims, 7 Drawing Sheets

(56) References Cited

U.S. PATENT DOCUMENTS

| | | | | |
|---|---|---|---|---|
| 2014/0115202 | A1* | 4/2014 | Yoshinaga | G06F 13/426 710/62 |
| 2014/0277937 | A1* | 9/2014 | Scholz | H04L 67/025 701/36 |
| 2016/0100018 | A1 | 4/2016 | Mackenzie et al. | |
| 2016/0103650 | A1* | 4/2016 | Lim | G06F 3/1462 345/2.2 |
| 2018/0253396 | A1* | 9/2018 | Zhao | H04L 29/08 |

OTHER PUBLICATIONS

Machine Translation and Abstract of Chinese Publication No. CN103401997, Nov. 20, 2013, 14 pages.

Machine Translation and Abstract of Chinese Publication No. CN202043133, Nov. 16, 2011, 12 pages.

Foreign Communication From a Counterpart Application, PCT Application No. PCT/CN2017/086579, English Translation of International Search Report dated Sep. 14, 2017, 2 pages.

Foreign Communication From a Counterpart Application, PCT Application No. PCT/CN2017/086579, English Translation of Written Opinion dated Sep. 14, 2017, 5 pages.

"Car Connectivity Consortium LLC,Car Connectivity Consortium MirrorLink", Core Architecture, Version 1.0.3 (CCC-TS-001), XP055160680, Jan. 22, 2013, 218 pages.

Foreign Communication From a Counterpart Application, European Application No. 17887494.7, Extended European Search Report dated Nov. 15, 2019, 6 pages.

Machine Translation and Abstract of Chinese Publication No. CN103200460, Jul. 10, 2013, 12 pages.

Liu, W., "For Research and Development of Based on Mirror Link Vehicle Entertainment System," College of Software Engineering Southeast University, Nov. 2015, 78 pages.

Foreign Communication From a Counterpart Application, Chinese Application No. 201780012894.8, Chinese Office Action dated Jan. 6, 2020, 7 pages.

* cited by examiner

DEVICE CONNECTION METHOD AND TERMINAL

CROSS-REFERENCE TO RELATED APPLICATIONS

This application is a U.S. National Stage of International Patent Application No. PCT/CN2017/086579 filed on May 31, 2017, which claims priority to Chinese Patent Application No. 201611225485.X filed on Dec. 27, 2016. Both of the aforementioned applications are hereby incorporated be reference in their entireties.

TECHNICAL FIELD

This application relates to the field of technologies of interconnection between a vehicular device and a terminal, and in particular, to a device connection method and a terminal.

BACKGROUND

To help a user use a terminal safely and efficiently during driving, the terminal can interconnect with a vehicular device, to display, on a touch display of the vehicular device, an image displayed on a screen of the terminal. In this way, the user can control the terminal by inputting a command to the vehicular device during driving, and therefore driving dangers caused when the user views or operates the terminal during driving are avoided. A connection between the terminal and the vehicular device is established based on an interconnect protocol. For example, the connection between the terminal and the vehicular device is established based on the MirrorLink protocol. The interconnect protocol supports establishment of a wired or wireless connection between the terminal and the vehicular device. For example, the Mirror-Link protocol supports a Universal Serial Bus (universal serial bus. USB) technology, to establish a wired connection between the terminal and the vehicular device. For another example, the MirrorLink protocol supports a Wi-Fi (Wireless Fidelity) technology, to establish a wireless connection between the terminal and the vehicular device.

Herein, to enable a user to control a terminal with a vehicular device as fast as possible, how to shorten a time for establishing a connection between the terminal and the vehicular device becomes a topic vigorously studied by a person skilled in the art.

SUMMARY

Embodiments of this application provide a device connection method and a terminal, so as to shorten a time for establishing a connection between the terminal and a vehicular device, and improve connection efficiency.

According to a first aspect, an embodiment of this application provides a device connection method, where the method is applied to a terminal, and the terminal supports an interconnect protocol between the terminal and a vehicular device; and the method may include: receiving, by the terminal, a communications connection request of the vehicular device; enabling, by the terminal in a process of connecting to a service of the interconnect protocol, a communications mode corresponding to the communications connection request; and when determining that the service is successfully connected and that the communications mode is successfully enabled, determining, by the terminal, that the terminal is successfully connected to the vehicular device by using the interconnect protocol. It can be learned that, in the foregoing manner, a first phase of a connection establishment process can be shortened, so that a time for establishing a connection between the terminal and the vehicular device can be shortened, and connection efficiency can be improved.

With reference to the first aspect, in some possible implementations, the enabling, by the terminal in a process of connecting to a service of the interconnect protocol, a communications mode corresponding to the communications connection request includes: triggering, by the terminal at a preset time point in a process in which an application layer connects to the service of the interconnect protocol, a kernel layer to enable the communications mode corresponding to the communications connection request. It can be learned that, in the foregoing manner, a time point at which the kernel layer is triggered to enable the communications mode can be controlled by using the application layer, so that controllability of an operation of the kernel layer can be ensured.

With reference to the first aspect, in some possible implementations, the triggering, by the terminal at a preset time point in a process in which an application layer connects to the service of the interconnect protocol, a kernel layer to enable the communications mode corresponding to the communications connection request includes: triggering, by the terminal at a start time point when the application layer connects to the service of the interconnect protocol, the kernel layer to enable the communications mode corresponding to the communications connection request. It can be learned that, in the foregoing manner, connecting to the service by the application layer and enabling the communications mode by the kernel layer can be triggered simultaneously, so that it can be ensured that the kernel layer completes enabling the communications mode as soon as possible, to shorten a connection time.

With reference to the first aspect, in some possible implementations, the communications connection request includes a USB connection request; and the enabling a communications mode corresponding to the communications connection request includes: switching a USB connection mode to a network control mode. It can be learned that, the method can be applied to a scenario of establishing a wired connection between the terminal and the vehicular device, so that a time for establishing a connection between the terminal and the vehicular device can be shortened, and USB connection efficiency can be improved.

With reference to the first aspect, in some possible implementations, the switching a USB connection mode to a network control mode includes: switching the USB connection mode to the network control mode when receiving a network control mode request. It can be learned that, in a USB connection process, communication between the kernel layer and the application layer can be implemented by receiving the network control mode request, so that the application layer performs mode switching based on a request of the kernel layer, thereby ensuring that an operation of the kernel layer is controllable.

With reference to the first aspect, in some possible implementations, the communications connection request includes a Wi-Fi connection request; and the enabling a communications mode corresponding to the communications connection request includes: enabling an access point AP mode. It can be learned that, the method can be further applied to a scenario of establishing a wireless connection between the terminal and the vehicular device, so that a time for establishing a Wi-Fi connection between the terminal and the vehicular device can be shortened, and Wi-Fi connection efficiency can be improved.

With reference to the first aspect, in some possible implementations, after the determining, by the terminal, that the terminal is successfully connected to the vehicular device by using the interconnect protocol, the method further includes: obtaining, by the terminal, a to-be-transmitted image; and processing, by the terminal, the to-be-transmitted image based on an image resolution requirement of the vehicular device. It can be learned that, corresponding processing can be performed on the to-be-transmitted image based on the image resolution requirement of the vehicular device, so that a connection success rate of a second phase can be increased.

With reference to the first aspect, in some possible implementations, the method further includes: receiving, by the terminal in a process of establishing a connection between the terminal and the vehicular device by using the interconnect protocol, information sent by the vehicular device, where the information carries the image resolution requirement of the vehicular device. It can be learned that, the terminal has learned the image resolution requirement of the vehicular device when the first phase of the connection process ends, and then can directly process the to-be-transmitted image based on the requirement, so that a connection time in the second phase is further shortened.

With reference to the first aspect, in some possible implementations, the method further includes: receiving, by the terminal after determining that the terminal is successfully connected to the vehicular device by using the interconnect protocol, information sent by the vehicular device, where the information carries the image resolution requirement of the vehicular device. It can be learned that, after being successfully connected by using the interconnect protocol, the terminal and the vehicular device can communicate with each other by using the interconnect protocol, and the vehicular device can send information to the terminal based on a real-time image resolution requirement, so that the terminal can obtain a requirement of the vehicular device more flexibly, and the connection success rate of the second phase can be increased.

With reference to the first aspect, in some possible implementations, the method further includes: connecting, by the terminal, to a Virtual Network Computing service in a process of obtaining the to-be-transmitted image; and transmitting, by the terminal, the processed to-be-transmitted image by using the Virtual Network Computing service. It can be learned that, obtaining the to-be-transmitted image and concurrently connecting to the Virtual Network Computing service can further shorten the connection time in the second phase.

According to a second aspect, an embodiment of this application provides a terminal, where the terminal has a function of implementing terminal behavior in the foregoing method design, and the function may be implemented by hardware, or implemented by executing corresponding software by hardware. The hardware or software includes one or more functional units. In this embodiment of this application, the terminal may include a communications unit and a processing unit, where the communications unit is configured to receive a communications connection request of a vehicular device; the processing unit is configured to enable, in a process of connecting to a service of the interconnect protocol, a communications mode corresponding to the communications connection request; and the processing unit is configured to: when determining that the service is successfully connected and that the communications mode is successfully enabled, determine that the terminal is successfully connected to the vehicular device by using the interconnect protocol. It can be learned that, in the foregoing manner, a first phase of a connection establishment process can be shortened, so that a time for establishing a connection between the terminal and the vehicular device can be shortened, and connection efficiency can be improved.

With reference to the second aspect, in some possible implementations, that the processing unit enables, in a process of connecting to a service of the interconnect protocol, a communications mode corresponding to the communications connection request includes: triggering, by the processing unit at a preset time point in a process in which an application layer connects to the service of the interconnect protocol, a kernel layer to enable the communications mode corresponding to the communications connection request. It can be learned that, in the foregoing manner, a time point at which the kernel layer is triggered to enable the communications mode can be controlled by using the application layer, so that controllability of an operation of the kernel layer can be ensured.

With reference to the second aspect, in some possible implementations, the triggering, by the processing unit at a preset time point in a process in which an application layer connects to the service of the interconnect protocol, a kernel layer to enable the communications mode corresponding to the communications connection request includes: triggering, by the processing unit at a start time point when the application layer connects to the service of the interconnect protocol, the kernel layer to enable the communications mode corresponding to the communications connection request. It can be learned that, in the foregoing manner, connecting to the service by the application layer and enabling the communications mode by the kernel layer can be triggered simultaneously, so that it can be ensured that the kernel layer completes enabling the communications mode as soon as possible, to shorten a connection time.

With reference to the second aspect, in some possible implementations, the communications connection request includes a USB connection request; and that the processing unit enables a communications mode corresponding to the communications connection request includes: switching, by the processing unit, a USB connection mode to a network control mode. It can be learned that, the method can be applied to a scenario of establishing a wired connection between the terminal and the vehicular device, so that a time for establishing a connection between the terminal and the vehicular device can be shortened, and USB connection efficiency can be improved.

With reference to the second aspect, in some possible implementations, the switching, by the processing unit, a USB connection mode to a network control mode includes: switching, by the processing unit, the USB connection mode to the network control mode when receiving a network control mode request. It can be learned that, in a USB connection process, communication between the kernel layer and the application layer can be implemented by receiving the network control mode request, so that the application layer performs mode switching based on a request of the kernel layer, thereby ensuring that an operation of the kernel layer is controllable.

With reference to the second aspect, in some possible implementations, the communications connection request includes a Wi-Fi connection request; and that the processing unit enables a communications mode corresponding to the communications connection request includes: enabling, by the processing unit, an access point AP mode. It can be learned that, the method can be further applied to a scenario of establishing a wireless connection between the terminal and the vehicular device, so that a time for establishing a Wi-Fi connection between the terminal and the vehicular device can be shortened, and Wi-Fi connection efficiency can be improved.

With reference to the second aspect, in some possible implementations, the processing unit is further configured to: obtain a to-be-transmitted image; and process the to-be-transmitted image based on an image resolution requirement of the vehicular device. It can be learned that, corresponding processing can be performed on the to-be-transmitted image based on the image resolution requirement of the vehicular device, so that a connection success rate of a second phase can be increased.

With reference to the second aspect, in some possible implementations, the communications unit is further configured to: receive, in a process of establishing a connection between the terminal and the vehicular device by using the interconnect protocol, information sent by the vehicular device, where the information carries the image resolution requirement of the vehicular device. It can be learned that, the terminal has learned the image resolution requirement of the vehicular device when the first phase of the connection process ends, and then can directly process the to-be-transmitted image based on the requirement, so that a connection time in the second phase is further shortened.

With reference to the second aspect, in some possible implementations, the communications unit is further configured to: receive, after the terminal is successfully connected to the vehicular device by using the interconnect protocol, information sent by the vehicular device, where the information carries the image resolution requirement of the vehicular device. It can be learned that, after being successfully connected by using the interconnect protocol, the terminal and the vehicular device can communicate with each other by using the interconnect protocol, and the vehicular device can send information to the terminal based on a real-time image resolution requirement, so that the terminal can obtain a requirement of the vehicular device more flexibly, and the connection success rate of the second phase can be increased.

With reference to the second aspect, in some possible implementations, the processing unit is further configured to: connect to a Virtual Network Computing service in a process of obtaining the to-be-transmitted image; and the communications unit is further configured to: transmit the processed to-be-transmitted image by using the Virtual Network Computing service. It can be learned that, obtaining the to-be-transmitted image and concurrently connecting to the Virtual Network Computing service can further shorten the connection time in the second phase.

According to a third aspect, an embodiment of this application provides a terminal, where the terminal includes a processor, a memory, and a computer program that is stored on the memory and that can be invoked and executed by the processor; and the processor can invoke the computer program to perform the following method: receiving a communications connection request of a vehicular device; enabling, in a process of connecting to a service of the interconnect protocol, a communications mode corresponding to the communications connection request; and when determining that the service is successfully connected and that the communications mode is successfully enabled, determining that the terminal is successfully connected to the vehicular device by using the interconnect protocol. It can be learned that, in the foregoing manner, a first phase of a connection establishment process can be shortened, so that a time for establishing a connection between the terminal and the vehicular device can be shortened, and connection efficiency can be improved.

With reference to the third aspect, in some possible implementations, a specific implementation in which the processor enables, in the process of connecting to the service of the interconnect protocol, the communications mode corresponding to the communications connection request is: triggering, at a preset time point in a process in which an application layer connects to the service of the interconnect protocol, a kernel layer to enable the communications mode corresponding to the communications connection request. It can be learned that, in the foregoing manner, a time point at which the kernel layer is triggered to enable the communications mode can be controlled by using the application layer, so that controllability of an operation of the kernel layer can be ensured.

With reference to the third aspect, in some possible implementations, a specific implementation in which the processor triggers, at the preset time point in the process in which the application layer connects to the service of the interconnect protocol, the kernel layer to enable the communications mode corresponding to the communications connection request is: triggering, at a start time point when the application layer connects to the service of the interconnect protocol, the kernel layer to enable the communications mode corresponding to the communications connection request. It can be learned that, in the foregoing manner, connecting to the service by the application layer and enabling the communications mode by the kernel layer can be triggered simultaneously, so that it can be ensured that the kernel layer completes enabling the communications mode as soon as possible, to shorten a connection time.

With reference to the third aspect, in some possible implementations, the communications connection request includes a USB connection request; and a specific implementation in which the processor enables the communications mode corresponding to the communications connection request is: switching a USB connection mode to a network control mode. It can be learned that, the method can be applied to a scenario of establishing a wired connection between the terminal and the vehicular device, so that a time for establishing a wired connection between the terminal and the vehicular device can be shortened, and USB connection efficiency can be improved.

With reference to the third aspect, in some possible implementations, a specific implementation in which the processor switches the USB connection mode to the network control mode is: switching the USB connection mode to the network control mode when receiving a network control mode request. It can be learned that, in a USB connection process, communication between the kernel layer and the application layer can be implemented by receiving the network control mode request, so that the application layer performs mode switching based on a request of the kernel layer, thereby ensuring that an operation of the kernel layer is controllable.

With reference to the third aspect, in some possible implementations, the communications connection request includes a Wi-Fi connection request; and a specific manner in which the processor enables the communications mode corresponding to the communications connection request is: enabling an access point AP mode. It can be learned that, the method can be further applied to a scenario of establishing a wireless connection between the terminal and the vehicular device, so that a time for establishing a Wi-Fi connection between the terminal and the vehicular device can be shortened, and Wi-Fi connection efficiency can be improved.

With reference to the third aspect, in some possible implementations, after the processor determines that the terminal is successfully connected to the vehicular device by using the interconnect protocol, the processor further performs the following steps: obtaining a to-be-transmitted image; and processing the to-be-transmitted image based on an image resolution requirement of the vehicular device. It can be learned that, corresponding processing can be performed on the to-be-transmitted image based on the image resolution requirement of the vehicular device, so that a connection success rate of a second phase can be increased.

With reference to the third aspect, in some possible implementations, the processor further performs the following step: receiving, in a process of establishing a connection between the terminal and the vehicular device by using the interconnect protocol, information sent by the vehicular device, where the information carries the image resolution requirement of the vehicular device. It can be learned that, the terminal has learned the image resolution requirement of the vehicular device when the first phase of the connection process ends, and then can directly process the to-be-transmitted image based on the requirement, so that a connection time in the second phase is further shortened.

With reference to the third aspect, in some possible implementations, the processor further performs the following step: receiving, after it is determined that the terminal is successfully connected to the vehicular device by using the interconnect protocol, information sent by the vehicular device, where the information carries the image resolution requirement of the vehicular device. It can be learned that, after being successfully connected by using the interconnect protocol, the terminal and the vehicular device can communicate with each other by using the interconnect protocol, and the vehicular device can send information to the terminal based on a real-time image resolution requirement, so that the terminal can obtain a requirement of the vehicular device more flexibly, and the connection success rate of the second phase can be increased.

With reference to the third aspect, in some possible implementations, the processor further performs the following steps: connecting to a Virtual Network Computing service in a process of obtaining the to-be-transmitted image; and transmitting the processed to-be-transmitted image by using the Virtual Network Computing service. It can be learned that, obtaining the to-be-transmitted image and concurrently connecting to the Virtual Network Computing service can further shorten the connection time in the second phase.

According to a fourth aspect, an embodiment of this application provides a computer readable storage medium, where the computer readable storage medium stores an instruction, and when the instruction runs on a computer, the computer executes the methods described in the foregoing aspects.

According to a fifth aspect, an embodiment of this application provides a computer program product including an instruction, where when the instruction runs on a computer, the computer executes the methods described in the foregoing aspects. It can be learned that, after receiving the communications connection request of the vehicular device, the terminal connects to the service of the interconnect protocol and concurrently enables the communications mode corresponding to the communications connection request, so that a time consumed in a process of establishing a connection between the terminal and the vehicular device can be reduced, and a speed of establishing the connection between the terminal and the vehicular device can be increased.

BRIEF DESCRIPTION OF DRAWINGS

To describe the technical solutions in the embodiments of this application more clearly, the following briefly describes the accompanying drawings required for describing the embodiments.

DESCRIPTION OF EMBODIMENTS

Terms used in the embodiments of this application are merely used to explain specific embodiments of this application, but not intended to limit this application.

To facilitate understanding of the embodiments of this application, the following briefly describes an application scenario of this application.

Figure 1:
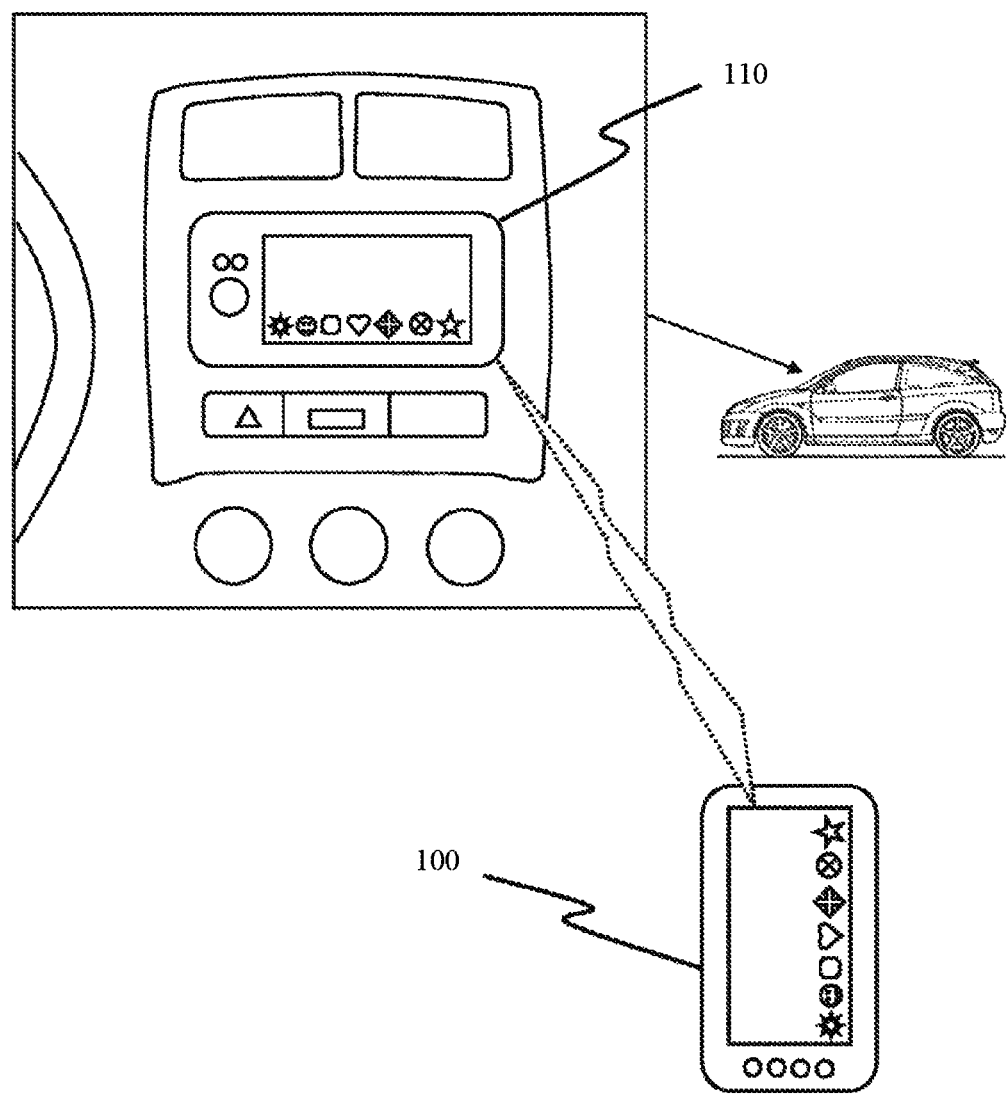
FIG. 1 is a schematic diagram of an application scenario according to an embodiment of this application.

Referring to FIG. 1, FIG. 1 is a schematic diagram of an application scenario according to an embodiment of this application. In the application scenario shown in FIG. 1, a terminal 100 and a vehicular device 110 can implement interaction, and a user can control the terminal 100 by controlling the vehicular device 110. The vehicular device 110 (also referred to as an in-vehicle machine) described in this embodiment of this application may be short for an in-vehicle information, in-vehicle communication, or in-vehicle entertainment product mounted in an automobile. The vehicular device needs to be functionally capable of implementing information communication between a human and a vehicle, between a vehicle and the outside (for example, between vehicles), and the like. The vehicular device 110 needs to be equipped with a display, and can implement communications interconnection with the terminal 100 and can be synchronized with a graphical user interface of the terminal 100. For example, the vehicular device 110 may be a head unit (head unit, HU) included in an in-vehicle infotainment (in-vehicle infotainment, IVI) system. A host and the display of the vehicular device 110 may be integrated, or may be disposed separately. The terminal 100 may be a device that can implement communications interconnection with the vehicular device, and the terminal 100 can implement a human-computer interaction function. For example, the terminal 100 may include a mobile phone (or referred to as a "cellular" phone), a computer with a mobile terminal, a potable, pocket-sized, handheld, or computer built-in mobile apparatus, an intelligent wearable device, or the like. For example, the terminal 100 may include a personal digital assistant (personal digital assistant, PDA), a tablet computer, a netbook computer, a portable computer, a media player, or an intelligent wearable device such as a smartwatch, a smart helmet, smart glasses, or a smart band; or include another device that includes at least a computing processor and a data storage apparatus.

Figure 2:
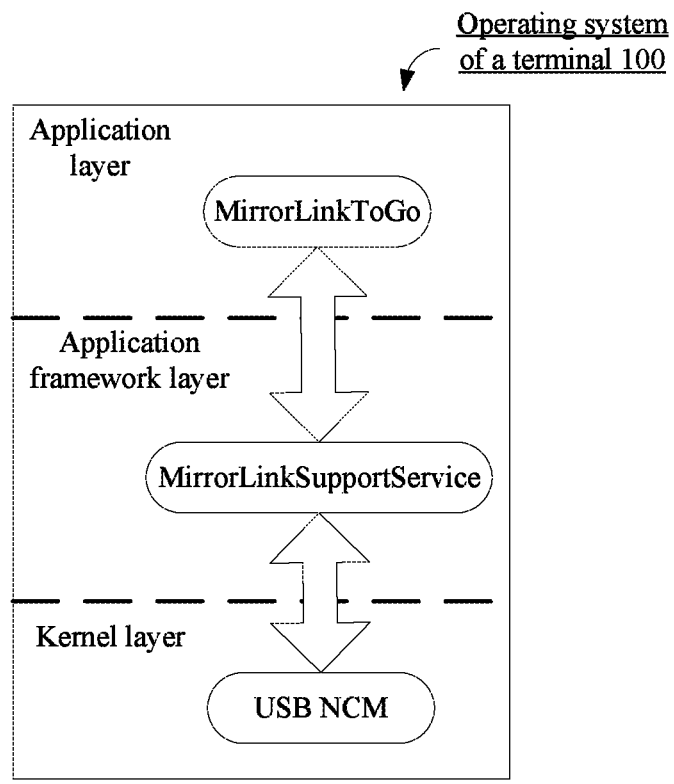
FIG. 2 is a schematic architectural diagram of an operating system installed on a terminal according to an embodiment of this application.

The terminal 100 and the vehicular device 110 can establish a communications link by using an interconnect protocol, and then implement communications interaction. The interconnect protocol may include MirrorLink, CarLife, CarPlay, Android Auto, or the like. Currently, the foregoing interconnect protocol can support a USB wired connection between the terminal and the vehicular device, and can support a Wi-Fi wireless connection between the terminal and the vehicular device. In this application, this embodiment of this application is described by using MirrorLink as an example. MirrorLink is a device interoperability standard released by the Car Connectivity Consortium (Car Connective Consortium, CCC) (an organization including various automobile and electronic device manufacturers). MirrorLink uses non-proprietary technologies, including the Internet Protocol (internet protocol, IP), Universal Serial Bus (universal serial bus, USB), the Real-Time Transport Protocol (real-time transport protocol, RTP), Wi-Fi (wireless fidelity, Wireless Fidelity), and the like. MirrorLink changes the terminal into an application platform that can be used in a vehicle. During establishment of a USB connection between the vehicular device and the terminal, a USB connection mode of the terminal needs to be switched to an NCM (network control mode, network control model), and then a communications link is established by using MirrorLink. In addition, MirrorLink uses a VNC (virtual network console, Virtual Network Computing) technology to transmit a graphical user interface (graphic user interface, GUI) update of the terminal from the terminal to the vehicle, to synchronize images displayed by the terminal and the vehicle. For a specific implementation of MirrorLink in the terminal 100, refer to FIG. 2. FIG. 2 shows a schematic architectural diagram of an operating system installed on the terminal 100. As shown in FIG. 2, the operating system installed on the terminal 100 is divided into an application (application) layer, an application framework (framework) layer, and a kernel (kernal) layer. MirrorLink is implemented at the application layer by using MirrorLinkToGo; and a service of MirrorLink is implemented at the application framework layer by using MirrorLinkSupportService, where MirrorLinkSupportService may also be a part of a system component, and the service of MirrorLink may be reflected as MirrorLinkToGoServerService. MirrorLinkToGoServerService includes respective services of protocols supported by MirrorLink. For example, services of MirrorLink may include a USB service, a Wi-Fi service, an RTP service, a VNC service, and the like. If MirrorLinkToGoServerService is successfully connected at the application layer by using MirrorLinkSupportService, it indicates that when the terminal and the vehicular device communicate with each other by using MirrorLink, a protocol supported by MirrorLink may be used for communication. For example, when the terminal and the vehicular device communicate with each other by using MirrorLink, VNC may be used to implement synchronous image updating. MirrorLink is implemented at the kernel layer by using a USB NCM or Wi-Fi P2P. To be specific, at the kernel layer, the USB connection mode needs to be switched to the NCM, or the terminal is used as an AP mode, so that the communications interconnection can be implemented by using MirrorLink. Certainly, the operating system installed on the terminal 100 may further include another layer. This is not specifically limited herein. Information exchange between the kernel layer and the application layer may pass through the application framework layer. In this application, the kernel layer and a USB interface of the terminal may be coupled and interconnected by using a USB driver. Herein, as an underlying driver, the USB driver can implement information exchange between a hardware circuit (herein referred to as the USB interface) of the terminal and the operating system of the terminal. The USB driver in this application may alternatively be implemented by a hardware abstraction layer (hardware abstraction layer, HAL).

Figure 3A:
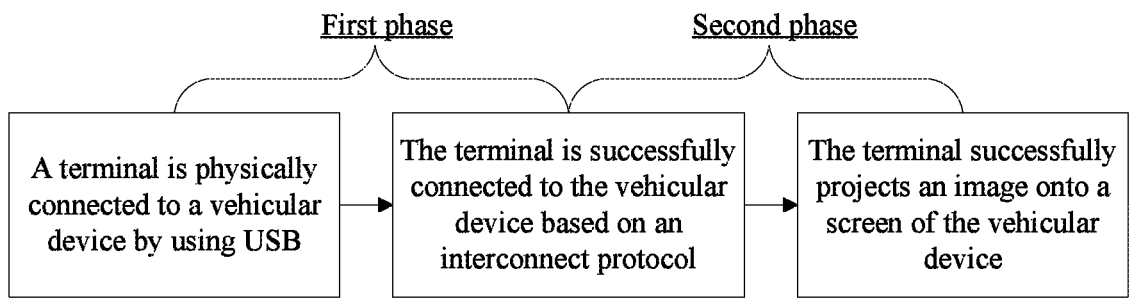
FIG. 3A is a schematic diagram of execution phases of establishment of a wired connection between a terminal and a vehicular device according to an embodiment of this application.
Figure 3B:
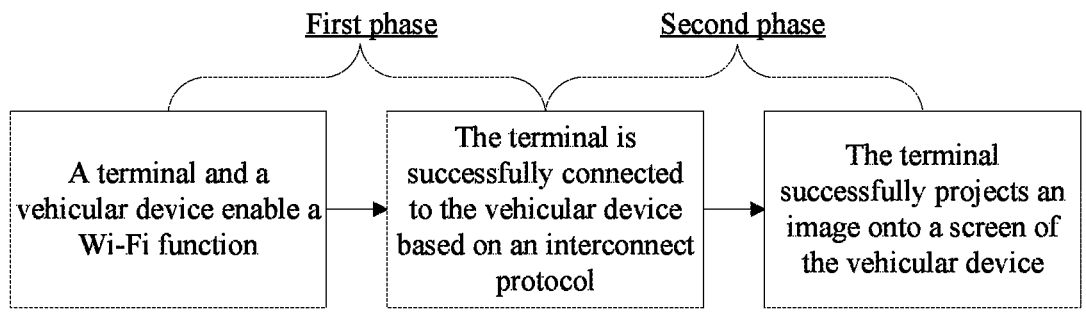
FIG. 3B is a schematic diagram of execution phases of establishment of a wireless connection between a terminal and a vehicular device according to an embodiment of this application.

Based on the application scenario shown in FIG. 1 and the operating system shown in FIG. 2, the following describes, with reference to FIG. 3A and FIG. 3B, manners of establishing a USB communications connection and a Wi-Fi communications connection between the terminal 100 and the vehicular device 110.

As shown in FIG. 3A, generally, establishment of the USB communications connection between the terminal 100 and the vehicular device 110 may be divided into two phases.

As shown in FIG. 3A, a first phase of the establishment of the USB communications connection starts when the terminal 100 and the vehicular device 110 are physically connected to each other by using a USB data transfer cable, and ends when the terminal 100 and the vehicular device 110 are successfully connected to each other based on the interconnect protocol. The phase may also be understood as preparations for data communication between the terminal 100 and the vehicular device 110.

As shown in FIG. 3B, a first phase of establishment of the Wi-Fi communications connection starts when the terminal 100 and the vehicular device 110 send a probe message by using a Wi-Fi technology, and ends when the terminal 100 and the vehicular device 110 are successfully connected to each other based on the interconnect protocol. The phase may also be understood as preparations for data communication between the terminal 100 and the vehicular device 110.

As shown in FIG. 3A and FIG. 3B, second phases of the establishment of the USB communications connection and the establishment of the Wi-Fi communications connection are the same. The second phase starts when the terminal 100 and the vehicular device 110 are successfully connected to each other based on the interconnect protocol, and ends when images displayed by the terminal 100 and the vehicular device 110 are successfully synchronized, that is, a graphical user interface of the terminal 100 is successfully projected onto a display screen of the vehicular device 110. In this phase, because the terminal 100 and the vehicular device 110 have been successfully connected to each other based on the interconnect protocol, the terminal 100 may process a screen image currently displayed by the terminal 100 into image data by using a data transfer protocol in the interconnect protocol, and transmit the image data to the vehicular device 110, to synchronize displayed images. Till this moment, the establishment of the connection between the terminal 100 and the vehicular device 110 described in this application is completed. In this application, the establishment of the connection between the terminal 100 and the vehicular device 110 may also be establishment of the communications connection between the terminal 100 and the vehicular device 110. As shown in FIG. 1, after the connection between the terminal 100 and the vehicular device 110 is successfully established, an image displayed on a display screen of the terminal 100 and an image displayed on the display screen of the vehicular device 110 are synchronized.

During specific implementation, in the first phase, during the establishment of the USB connection between the terminal 100 and the vehicular device 110, the terminal 100 and the vehicular device 110 are first physically connected to each other by using the USB data transfer cable. The vehicular device 110 sends an interconnect protocol-based connection request to the terminal 100 by using the USB data transfer cable. For example, the vehicular device 110 sends a MirrorLink request to the terminal 100. The USB interface of the terminal 100 generates a connection event (uevent) based on the connection request, and transfers the connection event to the kernel layer. After receiving the connection event, the kernel layer sends a switching request to the application layer. The switching request is used to request the application layer to determine that the kernel layer switches the USB connection mode to the network control mode. In the network control mode, the USB interface can be virtualized into a standard network interface, so that data communication between the vehicular device and the terminal can be implemented. After receiving the connection request transferred by the kernel layer, the application layer first connects to a service related to the interconnect protocol, and only after successfully connecting to the service related to the interconnect protocol, processes the switching request sent by the kernel layer. The application layer sends a switching-granted instruction to the kernel layer, and the kernel layer can perform mode switching only after receiving the instruction.

During specific implementation, in the first phase, during the establishment of the Wi-Fi connection between the terminal 100 and the vehicular device 110, the terminal 100 and the vehicular device 110 first need to enable a Wi-Fi function. Enabling the Wi-Fi function by the terminal 100 and the vehicular device 110 may be triggered by a user, or triggered by an application related to the interconnect protocol when the terminal 100 and the vehicular device 110 start the application. Specifically, after enabling the Wi-Fi function, the terminal 100 determines, by sending a probe message, whether the vehicular device 110 enables the Wi-Fi function; and if the terminal 100 receives a response from the vehicular device 110 for the probe message, the terminal 100 may determine that the vehicular device 110 enables the Wi-Fi function. The vehicular device 110 sends an interconnect protocol-based connection request to the terminal 100 by using Wi-Fi. For example, the vehicular device 110 sends a MirrorLink request to the terminal 100. After receiving the connection request, the terminal 100 may initiate a Wi-Fi P2P (Peer to Peer, peer-to-peer) connection to the vehicular device by using the application framework layer. Specifically, the terminal 100 also first uses the application layer to connect to a service related to the interconnect protocol, and only after successfully connecting to the service related to the interconnect protocol, negotiates an identity with the vehicular device 110. The terminal 100 enables a responding communications mode only after successfully negotiating the identity, and then a Wi-Fi connection is successfully established between the terminal 100 and the vehicular device 110. For example, after the terminal 100 and the vehicular device 110 negotiate on a group owner (Group Owner, GO) identity of the terminal 100 in a P2P group (group), the terminal 100 enables an access point (Access Point, AP) mode, to be specific, the terminal 100 serves as an access point, to enable the vehicular device 110 to connect to a network. Correspondingly, the terminal 100 and the vehicular device 110 may further negotiate on a group client (Group Client, GC) identity of the vehicular device 110 in the P2P group, to be specific, the vehicular device 110 connects to a network by using the terminal 100. For another example, after the terminal 100 and the vehicular device 110 negotiate on a group owner identity of the vehicular device 110 in a P2P group, the vehicular device 110 enables an access point mode, to be specific, the vehicular device 100 serves as an access point, to enable the vehicular device 110 to connect to a network. Correspondingly, the terminal 100 and the vehicular device 110 may further negotiate on a group client identity of the terminal 100 in the P2P group, to be specific, the vehicular device 110 connects to a network by using the terminal 100. In this embodiment of this application, that the terminal is negotiated as the GO and the vehicular device is negotiated as the GC is used as an example for description.

In an execution environment, the first phase takes approximately 6 s, and in the same execution environment, the second phase takes approximately 6 s. The execution environment may be that a HiSilicon 960 central processing unit, with a RAM of a 4 G storage capacity and a ROM of a 32 G storage capacity, is configured in the terminal. Herein, in an execution environment different from the foregoing example execution environment, a time consumed in the first phase and/or a time consumed in the second phase of the establishment of the connection between the terminal and the vehicular device may be different, and may be shorter than 6 s or may be longer than 6 s. This is not specifically limited herein.

To reduce a time consumed in establishing the connection between the terminal and the vehicular device, the following describes the embodiments provided in this application.

Figure 4:
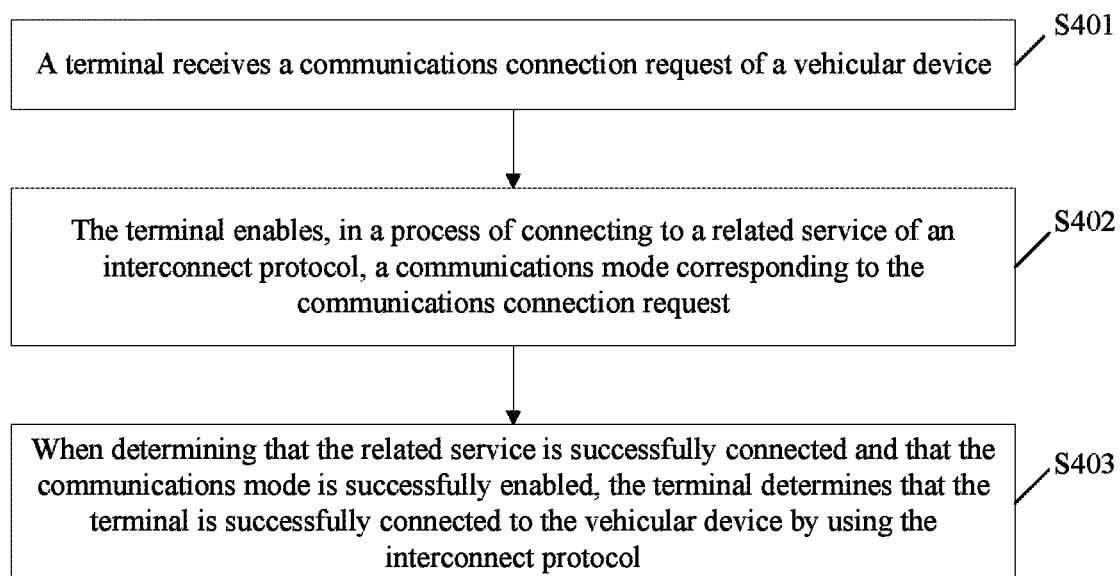
FIG. 4 is a schematic flowchart of a device connection method according to an embodiment of this application.

Referring to FIG. 4, FIG. 4 is a schematic flowchart of a device connection method according to an embodiment of this application. As shown in FIG. 4, the method may include the following steps:

Step S401: A terminal receives a communications connection request of a vehicular device.

In some possible implementations, the terminal can receive the communications connection request of the vehicular device, where the communications connection request may be a wired connection request, for example, a USB connection request, or may be a wireless connection request, for example, a Wi-Fi connection request. When the communications connection request of the vehicular device that is received by the terminal is a wired connection request, the terminal may be first physically connected to the vehicular device, for example, physically connected by using a USB cable. When the communications connection request of the vehicular device that is received by the terminal is a wireless connection request, the terminal may first determine that the vehicular device enables a wireless connection function. In a case, when receiving not only a wired connection request of the vehicular device but also a wireless connection request of the vehicular device, the terminal may prompt a user to select one connection manner; or the terminal selects one manner based on preconfiguration; or the terminal preferentially determines wireless communication quality of the wireless connection request, and selects a wireless connection manner if the wireless communication quality is good, or selects a wired connection manner if the wireless communication quality is poor; or the like. Herein, the communications connection request may be based on an interconnect protocol between the terminal and the vehicular device. For example, the communications connection request is a USB connection request based on MirrorLink, or the communications connection request is a Wi-Fi connection request based on MirrorLink.

Step S402: The terminal enables, in a process of connecting to a service of the interconnect protocol, a communications mode corresponding to the communications connection request.

In some possible implementations, the terminal can make corresponding preparations after receiving the communications connection request of the vehicular device, so as to be successfully connected to the vehicular device based on the interconnect protocol. Specifically, the terminal can enable, in the process of connecting to the service of the interconnect protocol, the communications mode corresponding to the communications connection request.

The terminal may enable, in the process of connecting to the service of the interconnect protocol, the communications mode corresponding to the communications connection request. A communications mode corresponding to the USB connection request is a USB NCM. A communications mode corresponding to the Wi-Fi connection request may be an access point AP mode, or when the terminal is negotiated as a GC identity, a communications mode corresponding to the Wi-Fi connection request may be a client mode, to be specific, the vehicular device serves as the access point AP mode. In other words, the terminal can implement data communication with the vehicular device only in a corresponding communications mode. After the terminal and the vehicular device are physically connected to each other by using the USB cable, if the terminal does not enable the NCM, the vehicular device charges the terminal by using the USB cable; and only when a USB connection mode of the terminal is switched to the NCM, implementation of a data connection between the terminal and the vehicular device can be ensured, that is, the user can control the terminal by controlling the vehicular device. For a specific execution manner of switching the USB connection mode, refer to the following embodiment.

Optionally, a specific implementation in which the terminal enables, in the process of connecting to the service of the interconnect protocol, the communications mode corresponding to the communications connection request is as follows:

The terminal connects to the service of the interconnect protocol by using an application layer in an operating system, and finally enables the communications mode by using a kernel layer, so that a corresponding module on control hardware can control sending and receiving of data in the communications mode. In other words, the terminal may connect to the service of the interconnect protocol by using the application layer, and concurrently enable the corresponding communications mode by using the kernel layer.

In a process in which the application layer connects to the service of the interconnect protocol, when the kernel layer receives a trigger message transferred by the application layer, the kernel layer starts to perform a process of enabling the communications mode. Alternatively, in a process in which the application layer connects to the service of the interconnect protocol, the kernel layer can perform, without communicating with the application layer, a process of enabling the communications mode.

In an implementation, the terminal may trigger, at a preset time point in the process in which the application layer connects to the service of the interconnect protocol, the kernel layer to enable the communications mode. The preset time point may be preconfigured, or may be determined by the application layer and the kernel layer through negotiation. This is not specifically limited herein.

Optionally, the preset time point may be determined based on a period of time for connecting to the service of the interconnect protocol by the application layer and a period of time for enabling the communications mode by the kernel layer. In a manner of determining, the preset time point is determined as a start time point at which the application layer connects to the service of the interconnect protocol, that is, connecting to the service by the application layer and enabling the communications mode by the kernel layer are triggered simultaneously. In another manner of determining, such a preset time point is determined when a process of connecting to the service by the application layer and a process of enabling the communications mode by the kernel layer end simultaneously. For example, if connecting to the service by the application layer takes 3 s, and enabling the communications mode by the kernel layer takes 2.7 s, the preset time point is determined as the $0.3^{rd}$ second in the foregoing process performed by the application layer. In other words, enabling the communications mode by the kernel layer is triggered at the $0.3^{rd}$ second in the foregoing process performed by the application layer, so that the processes respectively performed by the application layer and the kernel layer can end synchronously. Certainly, the preset time point may further have other manners of determining, which are not listed one by one herein.

Step S403: When determining that the service is successfully connected and that the communications mode is successfully enabled, the terminal determines that the terminal is successfully connected to the vehicular device by using the interconnect protocol.

In some possible implementations, when determining that the service is successfully connected and that the communications mode is successfully enabled, the terminal may determine that the terminal is successfully connected to the vehicular device by using the interconnect protocol. Herein, after it is determined that the terminal is successfully connected to the vehicular device by using the interconnect protocol, that is, after it is determined that the terminal and the vehicular device are successfully connected to each other in a first phase, a connection in a second phase may be further performed.

In this embodiment of this application, after receiving the communications connection request of the vehicular device, the terminal may enable, in the process of connecting to the service of the interconnect protocol, the communications mode corresponding to the communications connection request; and when determining that the service is successfully connected and that the communications mode is successfully enabled, the terminal determines that the terminal is successfully connected to the vehicular device by using the interconnect protocol. Connecting to the service of the interconnect protocol and concurrently enabling the corresponding communications mode can reduce a time consumed in a process of establishing a connection between the terminal and the vehicular device, and increase a speed of establishing the connection between the terminal and the vehicular device.

The following specifically describes an execution manner of the establishment of the USB connection between the terminal and the vehicular device provided in this embodiment of this application.

Figure 5:
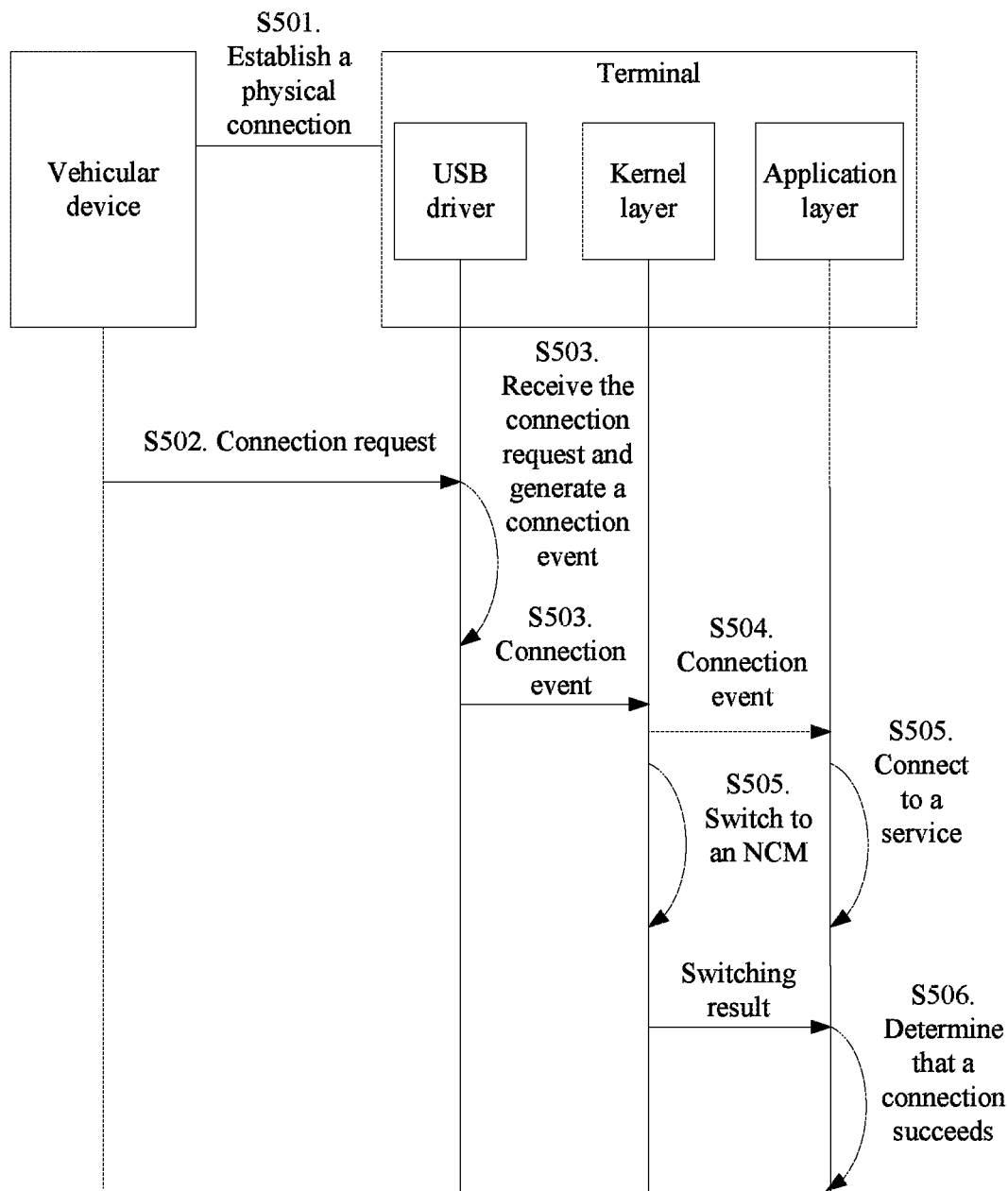
FIG. 5 is a schematic flowchart of a wired connection method for a device according to an embodiment of this application.

Referring to FIG. 5, FIG. 5 is a schematic flowchart of a wired connection method for a device according to an embodiment of this application. As shown in FIG. 5, the method may include the following steps:

Step S501: A terminal is physically connected to a vehicular device by using a USB data transfer cable.

Step S502: The vehicular device sends a USB connection request to the terminal by using the USB data transfer cable.

In some possible implementations, the terminal is first physically connected to the vehicular device by using the USB data transfer cable. After the terminal is physically connected to the vehicular device, the vehicular device is triggered to send the USB connection request to the terminal by using the USB data transfer cable. Specifically, after the terminal is physically connected to the vehicular device, the vehicular device may be triggered, based on a user instruction, to send the USB connection request to the terminal by using the USB data transfer cable. The user instruction may be received on the terminal or the vehicular device, which is not specifically limited herein. Alternatively, after the vehicular device detects that the vehicular device is physically connected to the terminal, the vehicular device is triggered in a preconfigured manner to send the USB connection request to the terminal. The USB connection request is used to request the terminal to perform a connection based on an interconnect protocol, and perform data communication. For example, in the MirrorLink protocol, a specific implementation of the connection request sent to the terminal by the vehicular device is a MirrorLink request, and the MirrorLink request is used to specifically indicate that the vehicular device needs to be connected by using USB.

Step S503: After a USB driver of the terminal receives the connection request, the USB driver generates a connection event (uevent) based on the connection request, and transfers the connection event to a kernel layer of the terminal.

In some possible implementations, after the USB driver of the terminal receives the connection request, the USB driver may generate a connection event (uevent) based on the connection request, and transfer the connection event to the kernel layer of the terminal. The USB driver may be implemented by an example hardware abstraction layer (hardware abstraction layer, HAL). The USB driver may transfer an event to the kernel layer in a uevent form, and may transfer the event to the kernel layer in a callback manner. Herein, a specific manner in which the USB transfers the event to the kernel layer in the callback manner is as follows: The kernel layer has a communications interface used for communication with the USB driver. Because the communications interface is reserved at the kernel layer, the kernel layer does not need to wait for the USB driver to transmit the event to the kernel layer. The kernel layer may send an event callback instruction to the USB driver, intended to instruct the USB driver to transfer an event to the kernel layer in the callback manner when the event is generated. When the USB driver needs to transmit the event to the kernel layer, the USB driver can use a callback (callback) function according to the event callback instruction, to transfer the event to the reserved communications interface of the kernel layer. When receiving a uevent through the reserved communications interface, the kernel layer may obtain, based on the received uevent, a specific message transferred by the USB driver. For example, in the MirrorLink protocol, when the kernel layer receives a uevent, and the uevent includes MIRRORLINK=REQUEST information, it indicates that the vehicular device sends a connection request (for example, a MirrorLink request) to the terminal.

Step S504: The kernel layer transfers the connection event to the application layer.

In some possible implementations, after receiving the connection event, the kernel layer may continue transferring the connection event to the application layer in a callback manner. For example, when the kernel layer transfers the connection event to the application layer, the connection event needs to pass through an application framework layer, and is transferred in a layer-by-layer callback manner.

Step S505: In a process in which the application layer connects to a service of an interconnect protocol, the kernel layer switches a USB connection mode to a network control mode.

In some possible implementations, the application layer may connect to the service of the interconnect protocol after receiving the connection event. Specifically, the application layer may trigger, by invoking a ConnectToService function, the application framework layer to connect to the service of the interconnect protocol. For example, in the MirrorLink protocol, the terminal may be understood as a server, and the application framework layer connects to MirrorLinkToGoServerService. After successfully connecting to MirrorLinkToGoServerService, the application framework layer transfers a connection result to the application layer in a callback manner. The connection result may be encapsulated into an event. After receiving the event, the application layer may determine, based on information (for example, MIRRORLINK_COMMAND_RECEIVED) carried in the event, that the service is successfully connected.

In some possible implementations, in the process in which the application layer connects to the service of the interconnect protocol, the kernel layer may synchronously switch the connection mode. Specifically, after receiving the connection event, the kernel layer may initiate connection mode switching, and the kernel layer switches the USB connection mode to the NCM. The terminal can implement communications interconnection with the vehicular device only when the USB connection mode is the NCM. Otherwise, after the terminal and the vehicular device are physically connected by using the USB data transfer cable, the terminal can only be charged. After successfully switching the USB connection mode to the NCM, the kernel layer may transfer a message to the application framework layer, and the application framework layer broadcasts, to the application layer, the message indicating that the kernel layer successfully switches the mode. The application framework layer may encapsulate the message into an event. After receiving the event, the application layer may determine, based on a message (for example, USB_CONNECTED) carried in the event, that the kernel layer successfully switches the USB connection mode.

Step S506: The application layer determines, when determining that the service is successfully connected and that the USB connection mode is successfully switched to the network control mode, that the terminal is successfully connected to the vehicular device by using the USB.

In some possible implementations, after determining that the terminal is successfully connected to the vehicular device by using the USB, the application layer may transfer the message to an interconnect system-related application program in a callback manner, so that the application program invokes a ServerManager.Start( ) function to enable the service of the interconnect protocol. Till this moment, the terminal implements a first phase of establishment of the connection to the vehicular device.

In some possible implementations, after the service of the interconnect protocol is successfully enabled, the vehicular device can synchronously display an image user interface of the terminal by using the interconnect protocol. The image user interface may be a home screen of an interconnect protocol-related application program in the terminal. After the vehicular device successfully displays the image user interface of the terminal, it can be determined that the vehicular device and the terminal are successfully connected based on the interconnect protocol. Till this moment, the terminal implements a second phase of the establishment of the connection to the vehicular device.

It can be learned that, after receiving the USB connection request of the vehicular device, the terminal connects to the service of the interconnect protocol and concurrently switches the USB connection mode to the network control mode, so that a time consumed in a process of establishing a connection between the terminal and the vehicular device can be reduced, and a speed of establishing the connection between the terminal and the vehicular device can be increased.

Figure 6:
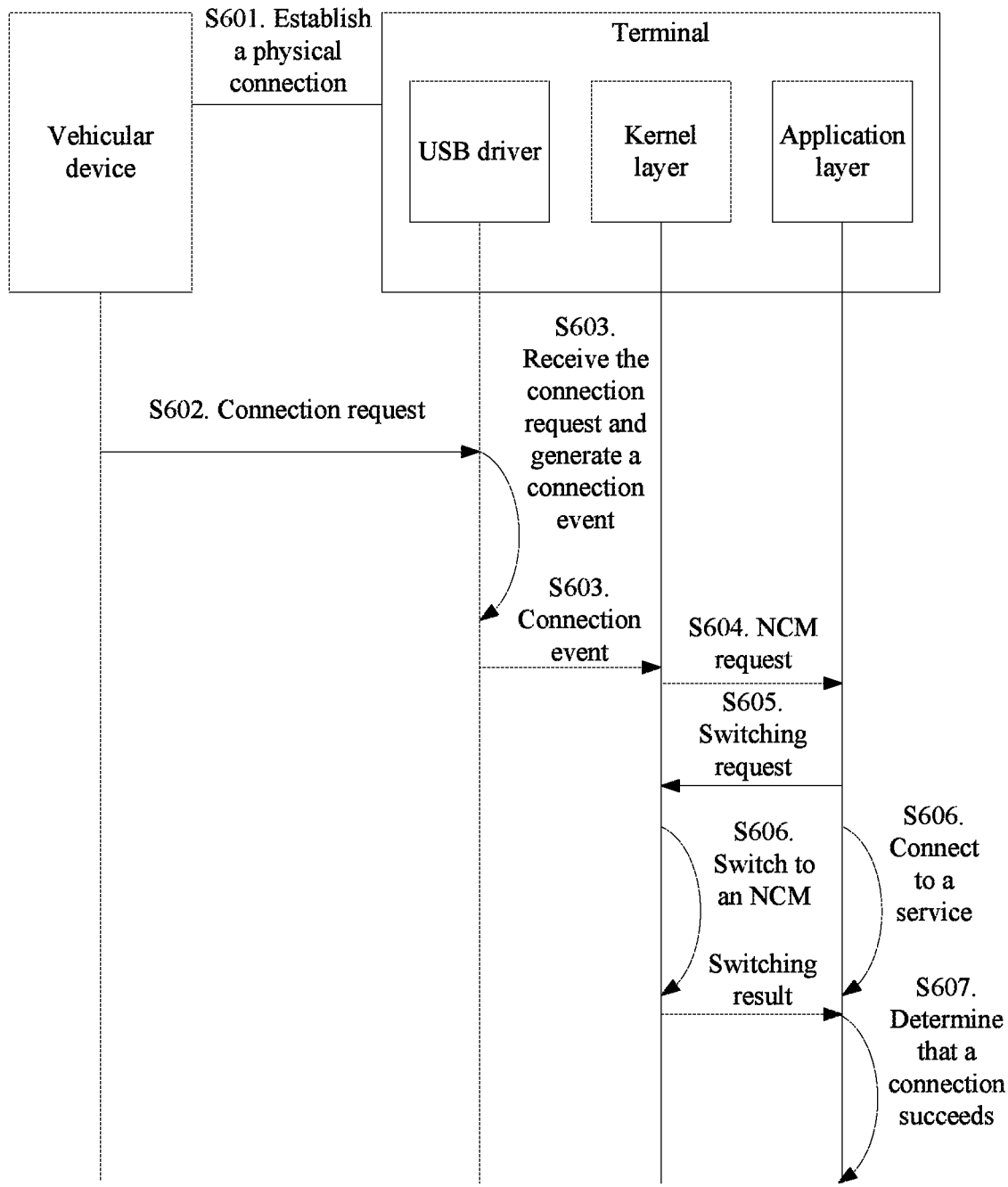
FIG. 6 is a schematic flowchart of another wired connection method for a device according to an embodiment of this application.

Referring to FIG. 6. FIG. 6 is a schematic flowchart of another wired connection method for a device according to an embodiment of this application. As shown in FIG. 5, the method includes the following steps:

Step S601: A terminal is physically connected to a vehicular device by using a USB data transfer cable.

Step S602: The vehicular device sends a connection request to the terminal by using the USB data transfer cable.

Step S603: After a USB driver of the terminal receives the connection request, the USB driver generates a connection event (uevent) based on the connection request, and transfers the connection event to a kernel layer of the terminal.

Step S604: The kernel layer transfers an NCM request to an application layer after receiving the connection event.

Step S605: The application layer transfers a switching request to the kernel layer after receiving the NCM request, where the switching request is used to request the kernel layer to switch a USB connection mode to an NCM.

Step S606: In a process in which the application layer connects to a service of an interconnect protocol, the kernel layer switches the USB connection mode to the network control mode when receiving the switching request.

Step S607: The application layer determines, when determining that the service is successfully connected and that the USB connection mode is successfully switched to the network control mode, that the terminal is successfully connected to the vehicular device by using the USB.

In a process of performing step S604 to step S606, the kernel layer needs to further transfer the NCM request to the application layer after receiving the connection event. Herein, whether the kernel layer transfers the connection event to the application layer is not specifically limited in this embodiment. The transferring, by the kernel layer, an NCM request to an application layer may be implemented in the following manner: transferring, by the kernel layer, the NCM request to an application framework layer, and broadcasting, by the application framework layer, the NCM request to the application layer. After the application layer receives the NCM request, the application layer is triggered to connect to the service of the interconnect protocol, and transfers a switching request for the NCM request to the kernel layer, where the switching request is used to instruct the kernel layer to switch the USB connection mode to the NCM. The kernel layer may switch the USB connection mode to the NCM after receiving the switching request. It should be noted that, the switching, by the kernel layer, the USB connection mode to the NCM is also implemented in the process in which the application layer connects to the service of the interconnect protocol, that is, switching the USB connection mode to the NCM by the kernel layer and connecting to the service of the interconnect protocol by the application layer are performed concurrently.

For a manner of performing the other steps, refer to specific descriptions in the embodiment shown in FIG. 5. Details are not described herein again.

In this embodiment, it can be learned that, the kernel layer sends the NCM request to the application layer, so that the application layer can know an execution status of the kernel layer. Therefore, an execution process of the kernel layer in a connection process is controllable.

For the foregoing method embodiments, in some possible implementations, after the terminal determines that the connection to the vehicular device based on the interconnect protocol succeeds, a message indicating that the connection succeeds may be displayed in a display interface of a screen of the terminal, to notify a user that a connection in a first phase is completed, so that the user learns progress of the connection between the terminal and the vehicular device in real time. Certainly, if the terminal determines, in the foregoing manner, that the connection to the vehicular device based on the interconnect protocol fails, the user may also be notified that the connection fails, and based on a cause of the connection failure, the user is instructed to perform a corresponding operation. For example, the user is instructed to plug in the USB data transfer cable again, or the like.

In some possible implementations, after the terminal is physically connected to the vehicular device by using the USB data transfer cable, and receives the connection request of the vehicular device, the terminal may notify the user of whether to perform data transmission with the vehicular device. If the terminal receives a confirmation operation of the user, the terminal may further perform the foregoing connection steps.

In some possible implementations, a monitoring mechanism may be set in the terminal, to monitor a process of establishing the connection between the terminal and the vehicular device in the foregoing method embodiments. If a message indicating that execution fails occurs in this process, the message is notified to the user in time, to re-establish a connection as soon as possible. In this monitoring mechanism, for example, after being physically connected to the vehicular device, the terminal detects whether the connection request sent by the vehicular device can be received within preset duration, and if the connection request cannot be received within the preset duration, determines that the connection fails, and notifies the user. For another example, when detecting that the application layer fails to connect to the service of the interconnect protocol or that the kernel layer fails to switch the USB connection mode, the terminal notifies a failure message to the user.

The following describes an execution manner of the establishment of the Wi-Fi connection between the terminal and the vehicular device provided in this embodiment of this application.

Figure 7:
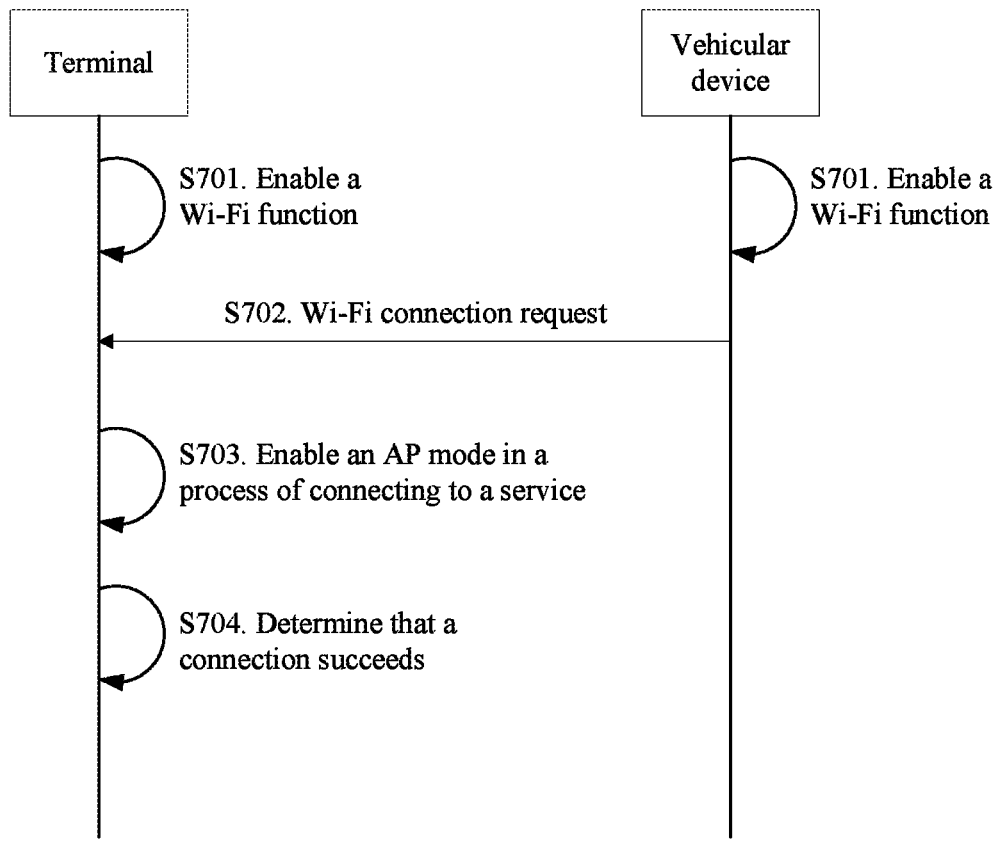
FIG. 7 is a schematic flowchart of a wireless connection method for a device according to an embodiment of this application.

Referring to FIG. 7, FIG. 7 is a schematic flowchart of a wireless connection method for a device according to an embodiment of this application. The method includes at least the following steps:

Step S701: A terminal and a vehicular device enable a Wi-Fi function.

In some possible implementations, the terminal enables the Wi-Fi function. The terminal may enable the Wi-Fi function based on a user operation (for example, a touch operation), or when the terminal starts an interconnect protocol-related application, the application enables the Wi-Fi function. This is not specifically limited herein. The vehicular device may enable the Wi-Fi function by detecting a user operation (for example, a touch operation), or after being powered on, the vehicular device may enable the Wi-Fi function based on a preset triggering condition or a configured time point. Herein, a manner in which the vehicular device enables Wi-Fi is not specifically limited in this embodiment of this application. After enabling the Wi-Fi function, the terminal may detect whether the vehicular device enables the Wi-Fi function. In an implementation, the terminal broadcasts a probe signal, and when receiving a response from the vehicular device for the probe signal, may determine that the vehicular device also enables the Wi-Fi function; or the terminal enables a monitoring function, and when detecting a probe signal broadcast by the vehicular device, may determine that the vehicular device enables the Wi-Fi function. The vehicular device may detect, by broadcasting a probe signal, whether the terminal enables Wi-Fi; and when receiving a response from the terminal for the probe signal, determines that the terminal also enables the Wi-Fi function. Alternatively, the vehicular device enables a monitoring function, and when detecting a probe signal broadcast by the terminal, may determine that the terminal enables the Wi-Fi function. After determining that the terminal enables the Wi-Fi function, the vehicular device may send a request to the terminal by using Wi-Fi.

Step S702: The vehicular device sends a Wi-Fi connection request to the terminal.

In some possible implementations, the vehicular device can send the Wi-Fi connection request to the terminal after determining that the terminal enables the Wi-Fi function. The Wi-Fi connection request is used to request to establish a Wi-Fi connection to the terminal, and after the Wi-Fi connection is established, communication can be implemented by using the MirrorLink protocol. In an implementation, the vehicular device sends the Wi-Fi connection request to the terminal in a broadcast manner. The terminal may enable a monitoring function, and when detecting the Wi-Fi connection request, may send a response for the Wi-Fi connection request to the vehicular device, for example, may send the response in a broadcast manner. After receiving the response, the vehicular device may stop broadcasting the Wi-Fi connection request. In another implementation, after determining that the terminal enables the Wi-Fi function, the vehicular device obtains an identifier of the terminal, and detects whether the identifier indicates a device to which the vehicular device needs to be connected. In this way, the vehicular device can send a targeted request to the terminal based on the identifier of the terminal. Specifically, the vehicular device may be triggered based on a user instruction, to send the Wi-Fi connection request to the terminal by using Wi-Fi, and the user instruction may be received on the terminal or the vehicular device, which is not specifically limited herein. Alternatively, after the vehicular device detects that the terminal enables the Wi-Fi function, the vehicular device is triggered in a preconfigured manner, to send the Wi-Fi connection request to the terminal. The Wi-Fi connection request is used to request the terminal to perform a connection based on an interconnect protocol, and perform data communication. For example, in the MirrorLink protocol, a specific implementation of the connection request sent to the terminal by the vehicular device is a MirrorLink request, and the MirrorLink request is used to specifically indicate that the vehicular device needs to be connected by using Wi-Fi. After receiving the Wi-Fi connection request, the terminal prepares for negotiation, to establish a Wi-Fi connection to the vehicular device. For details, refer to the following process.

Optionally, the Wi-Fi connection request may be sent to the vehicular device by the terminal. For a sending manner, refer to the foregoing implementation in which the vehicular device sends the Wi-Fi connection request to the terminal.

Step S703: The terminal enables an access point AP mode in a process of connecting to a service of an interconnect protocol.

In some possible implementations, after the terminal receives the Wi-Fi connection request sent by the vehicular device, an application framework layer can initiate a Wi-Fi P2P connection. A Wi-Fi P2P function is used to support a scenario in which two devices are connected and communicate with each other directly by using Wi-Fi when there is no access point (Access Point, AP) in a current environment. Specifically, the application framework layer can instruct the application layer to connect to the service of the interconnect protocol, and simultaneously, the application framework layer starts to search for a device that supports P2P.

Herein, for a manner in which the terminal connects to the service of the interconnect protocol, refer to specific descriptions in the foregoing embodiment. Details are not described herein again.

In a process in which the application layer connects to the service of the interconnect protocol, the application framework layer may further perform a connection based on the Wi-Fi P2P function. Specifically, the application framework layer searches for a device by using Wi-Fi P2P, to find a device that supports the Wi-Fi P2P function. In this embodiment, the application framework layer is intended to search for the vehicular device. After the vehicular device is found by using Wi-Fi P2P, a P2P group may be established for the terminal and the vehicular device; and after the P2P group is established, identities of the devices need to be further negotiated, that is, a device needs to serve as an AP, to implement a connection to a network. In an implementation, the terminal may send a negotiation message to the vehicular device, and the negotiation message includes information indicating a GO identity of the terminal, for the vehicular device to confirm. When the terminal receives a response that is fed back by the vehicular device on the negotiation message, it can be determined that negotiation between the terminal and the vehicular device succeeds. In other words, the terminal serves as the GO in the P2P group, the vehicular device serves as a GC in the P2P group, and the vehicular device connects to the network by using the terminal. After the GO identity of the terminal is confirmed, the application framework layer may notify the kernel layer that an AP mode may be enabled, and it indicates that the terminal communicates with the vehicular device as an AP.

Step S704: After determining that the application layer successfully connects to the service and that the kernel layer successfully enables the access point AP mode, the terminal determines that the terminal is successfully connected to the vehicular device by using Wi-Fi.

In some possible implementations, after determining that the application layer successfully connects to the service and that the kernel layer successfully enables the AP mode, the terminal may determine that the terminal is successfully connected to the vehicular device by using Wi-Fi. Then, the terminal may perform data communication with the vehicular device by using Wi-Fi.

In this embodiment of this application, after receiving the Wi-Fi connection request sent by the vehicular device, the terminal may connect to the service of the interconnect protocol and concurrently enable the AP mode, so that connection duration in a first phase of establishing a Wi-Fi connection between the terminal and the vehicular device can be effectively shortened, and a speed of establishing the connection between the terminal and the vehicular device can be increased.

The following describes some method embodiments for increasing a connection speed in a second phase. Methods in these embodiments are executed after a terminal and a vehicular device are successfully connected by using an interconnect protocol. The following method embodiment for increasing the connection speed in the second phase can be applied after a wired connection is successfully established between the terminal and the vehicular device, or can be applied after a wireless connection is successfully established between the terminal and the vehicular device.

Figure 8:
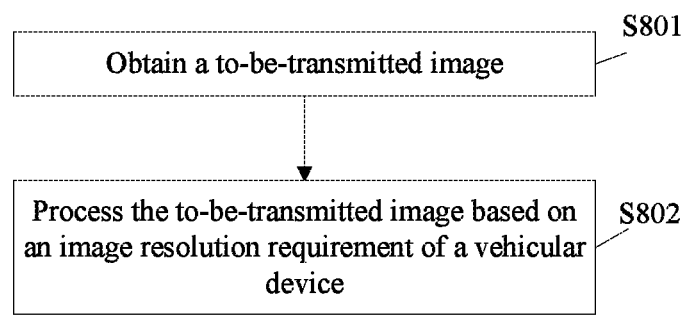
FIG. 8 is a schematic flowchart of a device communication method according to an embodiment of this application.

Referring to FIG. 8. FIG. 8 is a schematic flowchart of a device communication method according to an embodiment of this application. As shown in FIG. 8, the method may include the following steps:

Step S801: The terminal obtains a to-be-transmitted image after the terminal is successfully connected to the vehicular device by using the interconnect protocol.

In some possible implementations, after the terminal is successfully connected to the vehicular device by using the interconnect protocol, the terminal may capture an image currently displayed on a screen of the terminal, obtain the image currently displayed on the screen, and use the image as the to-be-transmitted image. Alternatively, the terminal may obtain a home screen of an interconnect protocol-related application program, and use the home screen as the to-be-transmitted image. When the terminal obtains the home screen of the interconnect protocol-related application program, and uses the home screen as the to-be-transmitted image, the home screen may be or may not be an image currently displayed on the screen of the terminal. For example, the image currently displayed on the screen of the terminal may be a home screen of the terminal, or an operation interface of another application program. Alternatively, a display status of the screen of the terminal may be a screen-off state. When the terminal is connected to the vehicular device in the screen-off state, power consumption of the terminal can be reduced.

Step S802: The terminal processes the to-be-transmitted image based on an image resolution requirement of the vehicular device.

In some possible implementations, the terminal may process the to-be-transmitted image based on the image resolution requirement of the vehicular device. The terminal may send an obtaining request to the vehicular device, and the vehicular device may send the image resolution requirement to the terminal in response to the obtaining request. The terminal may send the obtaining request to the vehicular device after being connected to the vehicular device. The terminal may send the obtaining request to the vehicular device in a process of obtaining the to-be-transmitted image. Alternatively, the terminal can receive, without sending the obtaining request to the vehicular device, information that carries the image resolution requirement and that is sent by the vehicular device. A format of the information sent by the vehicular device is known by the terminal and the vehicular device. The vehicular device may send the information at a preset time, or may trigger sending of the information based on an event. Correspondingly, the terminal may receive the information at a preset time, or may receive the information in real time, and after receiving the information, parse out the image resolution requirement of the vehicular device that is carried in the information. Optionally, the terminal may receive, in a process of establishing a USB connection to the vehicular device, that is, in a first phase, the information sent by the vehicular device. Alternatively, the terminal may receive, after being connected to the vehicular device by using the interconnect protocol, that is, in a second phase, the information sent by the vehicular device. Optionally, the terminal may receive, in the process of obtaining the to-be-transmitted image, the information sent by the vehicular device.

The terminal may process the to-be-transmitted image after receiving the image resolution requirement of the vehicular device, so that the processed to-be-transmitted image meets the image resolution requirement of the vehicular device. Processing the image may include compression or enhancement of the image, to meet the image resolution requirement of the vehicular device. In the foregoing manner, the image transmitted by the terminal can meet a display requirement of the vehicular device, so that the image transmitted by the terminal can be clearly displayed on a display screen of the vehicular device. In addition, if the image resolution requirement of the vehicular device is relatively low, an image that is compressed based on the image resolution requirement can be rapidly transmitted to the vehicular device, to avoid waste of data transmission resources, increase an image transmission speed, and further reduce a time consumed in the second phase of a connection between the terminal and the vehicular device.

In some possible implementations, the terminal may further connect to a Virtual Network Computing (VNC) service in a process of obtaining the to-be-transmitted image. The terminal uses the VNC service to transmit a compressed to-be-transmitted image to the vehicular device. The terminal concurrently performs the steps of obtaining the to-be-transmitted image and connecting to the VNC service, so that the time consumed in the second phase of the connection between the terminal and the vehicular device can be further reduced.

In conclusion, the foregoing method embodiment provides a method that is performed when the terminal is connected to the vehicular device. The foregoing method embodiment can reduce a time consumed in establishing a connection between the terminal and the vehicular device, and increase a speed of establishing the connection between the terminal and the vehicular device.

The following describes apparatus embodiments that can execute the foregoing method embodiments.

Figure 9:
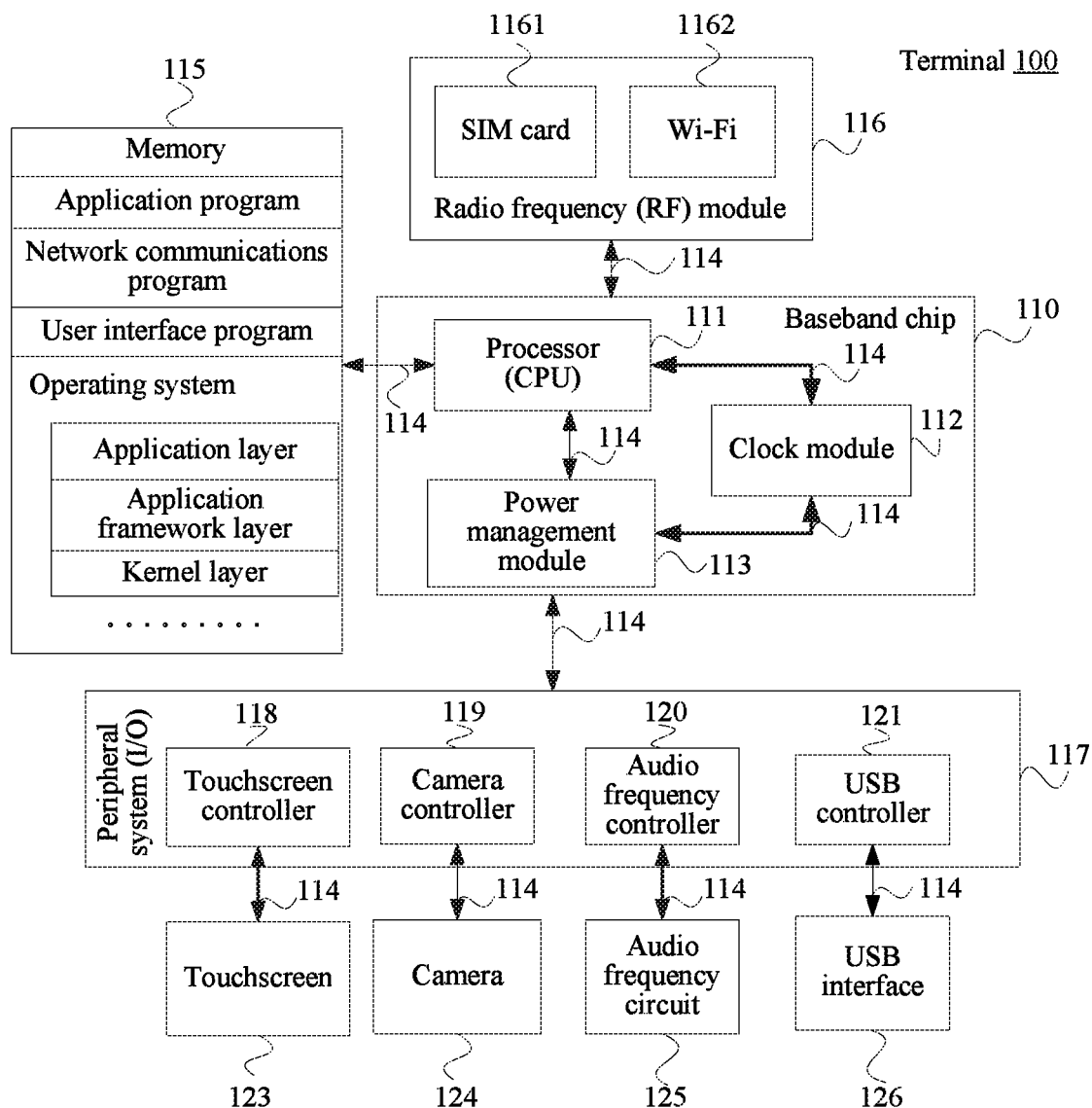
FIG. 9 is a schematic structural diagram of a terminal according to an embodiment of this application.

Referring to FIG. 9. FIG. 9 is a structural block diagram of an implementation of a terminal 100. As shown in FIG. 9, the terminal 100 may include a baseband chip 110, a memory 115 including one or more computer readable storage media, a radio frequency (RF) module 116, and a peripheral system 117. These components may communicate with each other over one or more communications buses 114.

The peripheral system 117 is mainly configured to implement an interaction function between the terminal 110 and a user/external environment, and mainly includes input/output apparatuses of the terminal 100. During specific implementation, the peripheral system 117 may include a touchscreen controller 118, a camera controller 119, an audio frequency controller 120, and a USB controller 121. These controllers may be coupled to respective corresponding peripheral devices, for example, a touchscreen 123, a camera 124, an audio frequency circuit 125, and a USB interface 126. It should be noted that, the peripheral system 117 may further include another I/O peripheral. In this embodiment of this application, a USB driver can drive the USB controller to interact with the USB interface. The USB driver may be stored in the memory 115 in an implementation of a hardware abstraction layer.

The baseband chip 110 may include: one or more processors 111, a clock module 112, and a power management module 113 in an integrated manner. The clock module 112 integrated in the baseband chip 110 is mainly configured to generate a clock required for data transmission and time sequence control for the processor 111. The power management module 113 integrated in the baseband chip 110 is mainly configured to supply stable and high-precision voltage to the processor ill, the radio frequency module 116, and the peripheral system.

The radio frequency (RF) module 116 is configured to send and receive a radio frequency signal and mainly integrated with a receiver and a transmitter of the terminal 100. The radio frequency (RF) module 116 communicates with a communications network and another communications device by using a radio frequency signal. In this embodiment of this application, a Wi-Fi module in the radio frequency module of the terminal 100 implements establishment of a Wi-Fi connection to a vehicular device. During specific implementation, the radio frequency (RF) module 116 may further include an antenna system, an RF transceiver, one or more amplifiers, a tuner, one or more oscillators, a digital signal processor, a CODEC chip, a SIM card, a storage medium, and the like. In some embodiments, the radio frequency (RF) module 116 may be implemented on a single chip.

The memory 115 is coupled to the processor 111 and configured to store various software programs and/or a plurality of sets of instructions. During specific implementation, the memory 115 may include a high-speed random access memory, and may further include a nonvolatile memory, for example, one or more magnetic disk storage devices, flash memory devices, or other nonvolatile solid-state storage devices. The memory 115 may store an operating system, for example, an embedded operating system such as Android, iOS, Windows, or Linux. In this embodiment of this application, an operation program may be divided into an application layer, an application framework layer, and a kernel layer. The memory 115 may further store a network communications program, and the network communications program may be used to communicate with one or more adjuncts, one or more terminal devices, and one or more network devices. The memory 115 may further store a user interface program, and the user interface program can vividly display content of an application program by using a graphical operation interface, and receive a control operation of a user on the application program by using an input control, such as a menu, a dialog box, and a key.

The memory 115 may further store one or more programs. As shown in FIG. 7, these programs may include an interconnect protocol-related application program, for example, a "driving mode" application, a schedule management application program such as Calendar, a social application program such as Facebook, an image management application program such as Photos, a map application program such as Google Maps, or a browser such as Safari or Google Chrome, which is related to the MirrorLink protocol.

The processor 111 can invoke program code stored in the memory 115, to execute some or all methods in the foregoing embodiments. In this embodiment of this application, the processor 111 can invoke a specific implementation for implementing a related function in an interconnect protocol in an architecture of the operating system, to execute some or all methods in the foregoing embodiments. For example, the processor 111 invokes MirrorLinkToGo in the application layer to connect to a service of MirrorLink, and the processor 111 invokes the kernel layer to switch a USB connection mode. It should be understood that, the terminal 100 is merely an example provided in this embodiment of the present invention. In addition, the terminal 100 may include more or fewer components than the shown components, two or more components may be combined, or the components may have different configuration implementations.

Based on the foregoing structure, the following describes some specific implementations for executing the foregoing method embodiments by using the foregoing structure.

For example, the terminal 100 is physically connected to the vehicular device by using the USB interface 126; and the terminal 100 receives a USB connection request of the vehicular device by using the USB interface 126. The USB controller 121 can encapsulate the USB connection request into an event, and notify the event to the processor 111. The processor 111 can invoke a computer instruction corresponding to the kernel layer in the operating system stored in the memory 115, to process the event; and can transfer the event to the application layer. The processor 111 can further invoke a computer instruction corresponding to the application layer, to connect to a service of the interconnect protocol. At the same time, the processor 111 can further invoke the computer instruction corresponding to the kernel layer, to switch the USB connection mode to an NCM.

For another example, the terminal 100 detects, by using the Wi-Fi module, whether the vehicular device enables a Wi-Fi function, and may receive, by using the Wi-Fi module 1162, a Wi-Fi connection request sent by the vehicular device. The Wi-Fi module 1162 can notify the connection request to the processor 111. The processor 111 can invoke computer instructions corresponding to the application framework layer and the kernel layer, to initiate a Wi-Fi P2P connection to the vehicular device, that is, enable an AP mode. At the same time, the processor 111 can further invoke a computer instruction corresponding to the application layer, to connect to a service related to the interconnect protocol.

Figure 10:
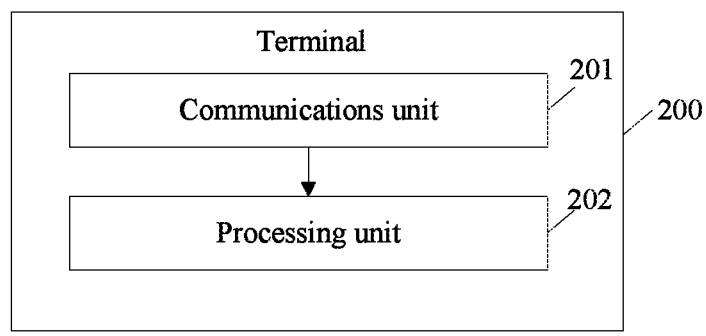
FIG. 10 is a functional block diagram of a terminal according to an embodiment of this application.

FIG. 10 shows a functional block diagram of a terminal according to an embodiment of this application. Function blocks of the terminal may implement solutions of this application by hardware, software, or a combination of hardware and software. A person skilled in the art may appreciate that, the function blocks described in FIG. 10 may be combined or separated into sub-blocks, to implement the solutions in the embodiments of the present invention. Therefore, content described above in this application can support any possible combination or separation or further definition of the following function modules. As shown in FIG. 10, a terminal 200 may include a communications unit 201 and a processing unit 202.

The communications unit 201 is configured to receive a communications connection request of a vehicular device.

The processing unit 202 is configured to enable, in a process of connecting to a service of the interconnect protocol, a communications mode corresponding to the communications connection request.

The processing unit 202 is configured to: when determining that the service is successfully connected and that the communications mode is successfully enabled, determine that the terminal is successfully connected to the vehicular device by using the interconnect protocol.

Specifically, a hardware implementation of the communications unit 201 may be a USB interface or a Wi-Fi module.

It should be noted that, the foregoing functional units or other functional units included in the terminal can further execute some or all methods described in the foregoing method embodiments. For a hardware structure on which the foregoing functional units are based, refer to the embodiment shown in FIG. 9. Details are not described herein again.

All or some of the foregoing embodiments of the present invention may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partly generated. The computer may be a general-purpose computer, a dedicated computer, a computer network, or another programmable apparatus. The computer instructions may be stored in a computer-readable storage medium or may be transmitted from a computer-readable medium to another computer-readable medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A device connection method implemented by a terminal, wherein the device connection method comprises:
   receiving, from a vehicular device and before a data communication connection between the terminal and the vehicular device is established, a communications connection request to establish the data communication connection;
   connecting, using an application layer of an operating system of the terminal, to a service of an interconnect protocol implemented by the terminal at the application layer;
   triggering, at a first time point while the application layer is connecting to the service of the interconnect protocol, a kernel layer of the operating system to enable a communications mode corresponding to the communications connection request; and
   determining that the terminal is successfully connected to the vehicular device using the interconnect protocol when the service is successfully connected and the communications mode is successfully enabled.

2. The device connection method of claim 1, wherein the communications connection request comprises a Universal Serial Bus (USB) connection request, and wherein triggering the kernel layer to enable the communications mode corresponding to the communications connection request comprises triggering switching a USB connection mode from a charging mode to a network control mode.

3. The device connection method of claim 2, wherein switching the USB connection mode to the network control mode comprises switching the USB connection mode to the network control mode when the application layer receives a network control mode request from the kernel layer.

4. The device connection method of claim 1, wherein the communications connection request comprises a WI-FI connection request, and wherein triggering the kernel layer to enable the communications mode corresponding to the communications connection request comprises triggering the kernel layer to enable an access point (AP) mode.

5. The device connection method of claim 1, wherein after determining that the terminal is successfully connected to the vehicular device using the interconnect protocol, the device connection method further comprises:
   obtaining a to-be-transmitted image; and
   processing the to-be-transmitted image based on an image resolution requirement of the vehicular device.

6. The device connection method of claim 5, further comprising receiving information from the vehicular device in a process of establishing a connection between the terminal and the vehicular device using the interconnect protocol, wherein the information carries the image resolution requirement of the vehicular device.

7. The device connection method of claim 5, further comprising receiving information from the vehicular device after determining that the terminal is successfully connected to the vehicular device using the interconnect protocol, wherein the information carries the image resolution requirement of the vehicular device.

8. The device connection method of claim 5, further comprising:
   connecting to a Virtual Network Computing service in a process of obtaining the to-be-transmitted image; and
   transmitting the to-be-transmitted image after the to-be-transmitted image is processed using the Virtual Network Computing service.

9. A terminal comprising:
   a processor; and
   a memory coupled to the processor and storing a computer program comprising an operating system, wherein the computer program, when executed by the processor, causes the terminal to:
   receive, from a vehicular device and before a data communication connection between the terminal and the vehicular device is established, a communications connection request to establish the data communication connection;

connect, using an application layer of the operating system of the terminal, to a service of an interconnect protocol implemented by the terminal at the application layer;

trigger, at a first time point while the application layer is connecting to the service of the interconnect protocol, a kernel layer of the operating system to enable a communications mode corresponding to the communications connection request; and determine that the terminal is successfully connected to the vehicular device using the interconnect protocol when the service is successfully connected and the communications mode is successfully enabled.

10. The terminal of claim 9, wherein the communications connection request comprises a Universal Serial Bus (USB) connection request, and wherein the terminal is configured to trigger the kernel layer to enable the communications mode by being configured to switch a USB connection mode to a network control mode.

11. The terminal of claim 10, wherein the terminal is configured to switch the USB connection mode to the network control mode when the application layer receives a network control mode request from the kernel layer.

12. The terminal of claim 9, wherein the communications connection request comprises a WI-FI connection request, and wherein the communications mode is an access point (AP) mode.

13. The terminal of claim 9, wherein after the terminal is configured to determine that the terminal is successfully connected to the vehicular device using the interconnect protocol, the terminal is further configured to:
obtain a to-be-transmitted image; and
process the to-be-transmitted image based on an image resolution requirement of the vehicular device.

14. The terminal of claim 13, wherein the terminal is further configured to receive information from the vehicular device in a process of establishing a connection between the terminal and the vehicular device using the interconnect protocol, and wherein the information carries the image resolution requirement of the vehicular device.

15. The terminal of claim 13, wherein the terminal is further configured to receive information from the vehicular device after the terminal is successfully connected to the vehicular device using the interconnect protocol, and wherein the information carries the image resolution requirement of the vehicular device.

16. The terminal of claim 13, wherein the terminal is further configured to:

connect to a Virtual Network Computing service in a process of obtaining the to-be-transmitted image; and
transmit the to-be-transmitted image after the to-be-transmitted image is processed using the Virtual Network Computing service.

17. A computer program product comprising computer-executable instructions for storage on a non-transitory computer-readable medium that, when executed by a processor, cause a terminal to:

receive, from a vehicular device and before a data communication connection between the terminal and the vehicular device is established, a communications connection request to establish the data communication connection;

connect, using an application layer of an operating system of the terminal, to a service of an interconnect protocol implemented by the terminal at the application layer;

trigger, at a first time point while the application layer is connecting to the service of the interconnect protocol, a kernel layer of the operating system to enable a communications mode corresponding to the communications connection request; and determine that the terminal is successfully connected to the vehicular device using the interconnect protocol when the service is successfully connected and the communications mode is successfully enabled.

18. The computer program product of claim 17, wherein the communications connection request comprises a Universal Serial Bus (USB) connection request, and wherein the computer-executable instructions cause the terminal to trigger the kernel layer to enable the communications mode by triggering the kernel layer to cause the terminal to switch a USB connection mode to a network control mode.

19. The computer program product of claim 18, wherein the computer-executable instructions cause the terminal to trigger the kernel layer to cause the terminal to switch the USB connection mode to the network control mode when the application layer receives a network control mode request from the kernel layer.

20. The computer program product of claim 17, wherein the communications connection request comprises a WI-FI connection request, and wherein the computer-executable instructions cause the terminal to trigger the kernel layer to enable the communications mode by causing the kernel layer to enable an access point (AP) mode.

* * * * *